H. HILL & J. B. DYER.
ELECTRIC GENERATOR REGULATOR.
APPLICATION FILED FEB. 27, 1913.

1,180,039.

Patented Apr. 18, 1916.

Witnesses:
Robert H. Weir
Arthur Carlson

Inventors:
Hugh Hill
and John B. Dyer
By Cheever & Cox Attys.

UNITED STATES PATENT OFFICE.

HUGH HILL AND JOHN B. DYER, OF ANDERSON, INDIANA.

ELECTRIC-GENERATOR REGULATOR.

1,180,039. Specification of Letters Patent. Patented Apr. 18, 1916.

Application filed February 27, 1913. Serial No. 750,998.

*To all whom it may concern:*

Be it known that we, HUGH HILL and JOHN B. DYER, citizens of the United States, residing at Anderson, in the county of Madison and State of Indiana, have invented a certain new and useful Improvement in Electric-Generator Regulators, of which the following is a specification.

The invention relates to improved means for automatically adapting the output of a variable speed electric current generator to its load and includes a switching device operated at a speed proportional to the speed of the generator and serving, according to its speed, to regulate the magnetizing effect or number of ampere turns of one of the generator windings, or sets of windings, such as a stationary generator field winding.

The characteristics of the invention will fully appear from a description of the preferred embodiment thereof shown in the accompanying drawings.

Figure 1:
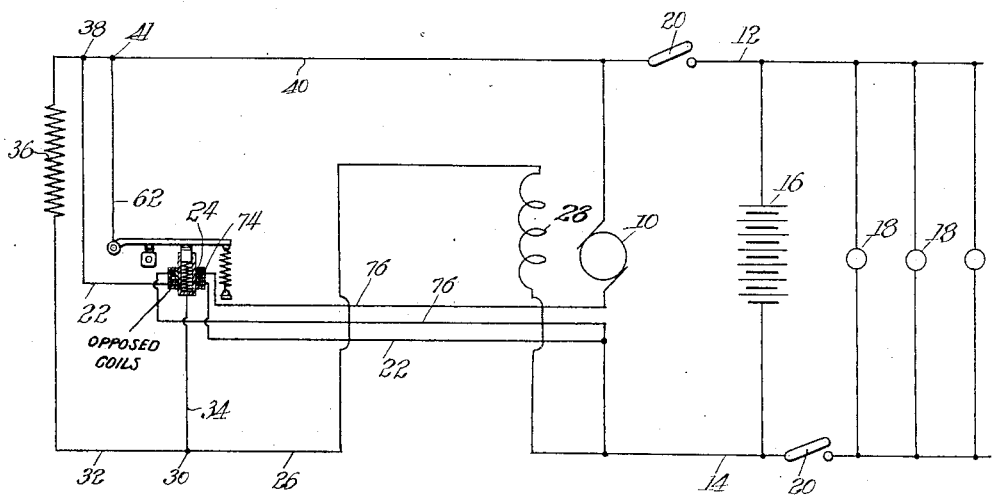
Figure 2:
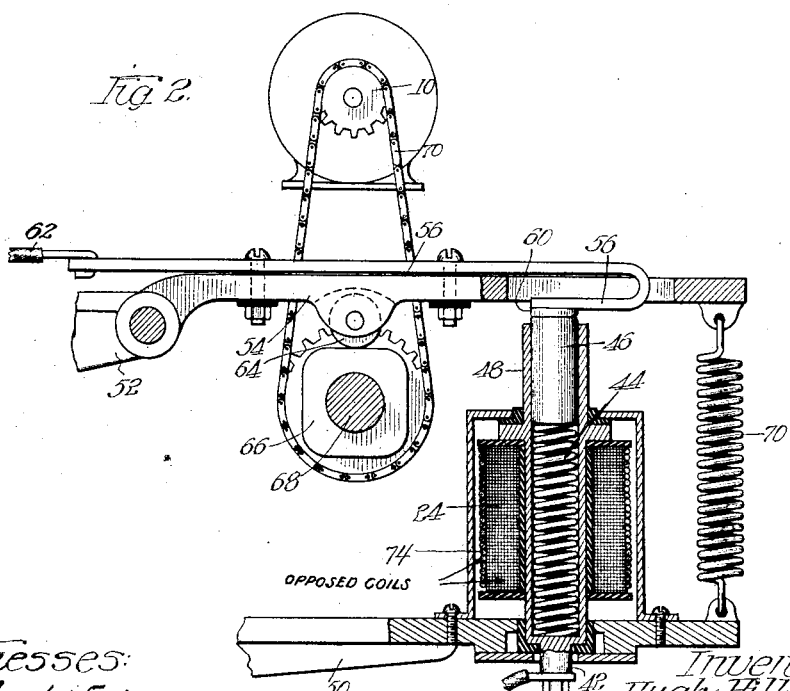

In the drawings, in which similar numerals indicate the same parts throughout the several views; Figure 1 is a circuit diagram of one preferred method of carrying out this invention. Fig. 2 is a side view of a preferred form of an electromechanical device adapted to carry out this invention.

A shunt wound electric generator 10 of any suitable size is provided adapted to deliver current through the wires 12 and 14 to a storage battery 16 and one or more lamps 18 or other devices requiring electric energy. The switches 20 may be used when and as needed in the ordinary manner. The wires 22 and high resistance magnet 24, to be hereafter referred to, are also in parallel with the lamps and battery in the ordinary manner. By means of the invention the generator 10 is so regulated that its output will be substantially constantly adapted to its load, regardless of sharp variations in the speed of the motor of whatever type which drives the generator 10, and the consequent variations of speed of the generator armature. The device for this purpose is shown in Fig. 2 and will now be described.

The wire 26 from the field shunt coil 28 of the generator is divided at a suitable point, as 30, into two branches 32 and 34. The branch wire 32 passes through a fixed resistance 36 and joins at 38 to return wire 40 leading back to the generator. On the other hand the other branch of this supplemental shunt circuit leads through wires 34 and 62 and the device of this invention, illustrated in Fig. 2, to said return wire 40 at 41.

The above device, to which wire 34 is connected at 42, includes the coiled spring 44 which sustains a weight 46 made of iron or the like which is easily magnetically attracted and is movable within a tube 48 of brass or other non-magnetic material placed inside of and suitably insulated from the magnet coil 24, heretofore described, and a mechanical vibrator 54 engaging the weight and connected at its opposite end to wire 62, the vibrator being moved by a cam 66.

More in detail the magnet 24 and the brass tube 48 and parts connected therewith just described are suitably supported by any suitable supporting device, such as bracket 50. Also suitably supported upon a stationary support 52 and above the end of weight 46 is a pivoted lever 54 provided with an electric conductor 56 contacting at one end at 60 the weight 46 and connected at its other end by suitable wire 62 to the return wire 40, heretofore referred to. The contact 60 thus constitutes a vibratory switch contact driven by the generator at a speed proportional thereto, while the element 46 constitutes a sluggishly moving follow up contact complemental to the aforesaid contact. On the lower side of lever 54 is a roller 64 resting and traveling upon a cam 66 mounted on a shaft 68 which shaft is mechanically connected with the shaft of the generator 10 so as to be rotated by it and consequently varying speed with it.

In the operation of the device, assume that the moving automobile or other motor which is driving the generator 10 is moving at a speed which rotates the armature 10 at a relatively low speed, say, two hundred revolutions per minute. Current generated by the armature 10 will flow through the shunt coil 28 in the ordinary manner and from it through both branches 32 and 34 of the supplementary shunt device in proportion to their respective resistances. As the generator 10 is running very slowly, the cam 66 will rotate very slowly with the result that the weight 46 can, under the action of spring 44, move fast enough to constantly maintain itself in contact at the point 60 with the member 56 on arm 54. As the resistance through these parts is much less under these conditions than the resistance 36, the shunt circuit, as a whole, will be of a low resistance and a large current will accordingly flow through it, thereby maintaining the generator 10 in a condition to supply the proper current to the lamps 18 notwithstanding the slow speed at which the armature of the generator 10 is running. When, now the speed of the generator 10 is increased, say to five hundred revolutions per minute, the speed of the cam 66 has correspondingly increased, making the lever arm 54 vibrate correspondingly more rapidly than before, with the result that there is less time length of contact at the vibratory contact 60 because the inertia of weight 46 is so great, that it cannot vibrate fast enough, to maintain itself constantly in contact as before at 60. The result is that the resistance in branch 34 of the supplementary shunt is increased and that consequently the current of the entire shunt is less, with the result that the generator 10 is correspondingly regulated so as to make its output correspond to the requirements, this result depending upon the vibration of the contact 60 at a rate proportional to the generator speed. If the generator 10 is now run at a still higher speed, say 800 revolutions per minute, the conditions referred to in the last statement of conditions are greatly intensified and the make and break of contact at the point 60 will become so rapid as to reduce to a small amount the current which will pass through that point and consequently through the supplementary shunt 34, with the result that the resistance of the shunt becomes but little less than the resistance of the coil 36 with corresponding regulation of the output of the generator.

In practice, the spring 70 which holds the arm 54 so that the cam wheel 64 bears on cam 66, is made of such a strength that it will hold the roller 64 in contact with the cam 66 and at the same time is made slightly stronger in proportion to its work than the spring 44 so as to insure the parts always operating as described.

The method of connecting the shaft 68 to the armature of generator 10 is wholly immaterial. In the particular case here illustrated a belt 70 is shown but gearing or any other suitable means may be used without departing from this invention. The vibrating cam may be on the armature shaft or elsewhere.

It will be noticed that nothing has thus far been said of the purpose or effect of the magnet 24 and its connecting wires 22 and the magnet 74 and its connecting wires 76, and for the purposes of normal operation of the device as described these parts may be either disconnected or wholly omitted. The vibrator device thus far described is mechanically operated and therefore within limits responds slowly to changes in load upon the generator and the magnets 24 and 74 are provided to furnish more accurate regulation in abnormally sudden changes in load.

The magnet, as for instance the inner one 24, connected by the wires 22 in parallel with the lamps 18, is made of many turns of high resistance wire while the other magnet, in this case the outer one 74, is made of relatively large wire and is connected by the wire 76 to any point in the circuit leading from the dynamo which will put this coil in series with the armature and the entire load of the dynamo, i. e., the group of lamps 18, battery 16, circuit 22 and shunt field 28. The element 24 thus is subject to the generator pressure and constitutes a pressure winding, while the element 74 is subject to the generator current and constitutes a current winding. The wire connections are so made that when current starts out from the generator 10 in a given direction it will flow in one direction about the spool 48 through the coil 74 and a portion of the current will later in its travel be shunted through the coil 24 in the opposite direction from that of the current in the coil 74. The resistances of these two coils are so proportioned to each other that when a normal load is on the generator, i. e. when the battery 16 is properly connected as shown and all of the lamps 18, for which the particular apparatus is intended, are in circuit these coils neutralize each other and the device operates exactly as first described.

If the coil 24 were not provided, connected as stated, and the battery 16 and all the lamps 18 were suddenly cut out of circuit by accident or otherwise, or the generator 10 were very suddenly speeded up to a high speed, a high voltage would be suddenly created at the brushes of the generator thus impressing across the vibrating contact 60 and through the shunt field of the generator a high voltage which might before the device could be regulated by the inertia of the weight 46, as described, cause too large a current to pass across the vibratory contact 60 with possible danger of burn out, but with the coil 24 in place this high voltage across the poles of the generator causes a current to pass through this magnet 24 and instantly draw the weight 46 proportionally away from the vibrator member 56 and thus reduce the frequency and length of contact between the weight 46 and the member 56 on the contact 60. In other words, the magnetic action of the magnet 24 affects the contacting action at 60 just as though the spring 44 were suddenly weakened, the weight remaining the same; or the weight 46 were suddenly increased, the spring 44 retaining its previous strength. The result of this is, therefore, to quickly reduce the length and frequency of contact at 60 and thus cut down the current through the shunt coil 28 and thus regulate the entire device in the manner described. If now some of the lamps 18 are switched on, other normal resistance, as the battery 16 being still disconnected, some current will necessarily start to flow through these lamps 18 and through the coil 74, and this current through the coil 74 counteracts to the extent of its strength the action of the magnet 24 and thereby allows the spring 44 to act proportionally more strongly on the weight 46 thus increasing proportionally the length of contact at 60 and thus proportionally increasing the current through the shunt coil 28 with the result that the whole device promptly regulates itself to provide proper current for the required lamps which have been switched on.

From the foregoing it will be observed that the switching device which is operated at a speed proportional to the generator speed is adapted for inclusion in direct low resistance shunt of the fixed resistance 36 when the speed of the generator 10 is very low then to exclude the fixed resistance from circuit with the field winding 28 for the purpose of increasing the proportion of the output of the generator with respect to the generator speed, the switch including a follow up contact 46 which is sluggishly operated mechanically and which follow up contact follows its complemental contact 60 in the then slow movements of the latter, then to maintain the low resistance shunt about the fixed resistance. At the highest speeds of the armature the operation of the switch is so fast that the follow up contact has practically no opportunity to effectively establish the shunt about the fixed resistance. The follow up contact is desirably in the form of a solenoid core subject to the action of the two differential solenoid windings 74, 24, the first winding being of low resistance in series with the armature and the other winding being of high resistance in bridge of the transmission mains whereby these windings normally neutralize each other to enable the follow up contact normally to be subject to mechanical operation only. If for any reason the current through the armature should be abnormally or relatively increased or should the pressure upon the high resistance bridge winding be abnormally or relatively increased the magnetizing effects of these windings will be thrown out of balance, their effective magnetization then operating to withdraw the follow up core contact to prevent the establishment of the shunt about the fixed resistance irrespective of the speed of the armature.

When the battery and all of the lamps are switched on the current through the magnet 74 becomes strong enough to neutralize the effect of magnet 24 and the whole device operates as first described.

Having thus described our invention, what we claim as new and desire to secure by Letters Patent, is:

1. In a device of the class described, the combination of a reciprocatable member spring moved in one direction, a second reciprocatable member normally in contact with the first member and movable toward and from it, mechanism for so moving the second member comprising a spring tending to move it toward the first member against the action of the spring which controls said first member, and a cam device for moving it in the opposite direction against the action of its said spring, means for conducting electric current through said reciprocatable members at their point of contact with each other, and means for operating said cam, for the purposes set forth.

2. In a device of the class described, the combination of a reciprocatable weight, a spring supporting said weight, a second reciprocatable member bearing upon said weight, a spring holding said second member normally in contact with the weight and partially compressing the spring which supports it, means for conducting electric current through said weight and said member contacting it at their point of contact, and means for reciprocating the second member toward and from the weight, for the purposes set forth.

3. In a device of the class described, the combination of a reciprocatable weight, a spring supporting said weight, a second reciprocatable member bearing upon said weight, a spring holding said second member against the weight and partially compressing the spring which supports it, means for conducting electric current through said weight and said member contacting it at their point of contact, and a cam device operatable at any desired speed for reciprocating the second reciprocatable member, for the purposes set forth.

4. In a device of the class described, the combination of a reciprocatable weight, a spring supporting said weight, a magnetic coil tending to steady the action of said weight, a second reciprocatable member bearing upon said weight, a spring holding said member normally in contact with the weight and partially compressing the spring which supports it, means for conducting electric current through said weight and said member contacting it at their point of contact, and a cam device operatable at any desired speed for reciprocating the second reciprocatable member.

5. In combination with an electric generator and a field coil thereof, two electric circuits connected in parallel with each other and in series with the field coil, one of said circuits containing a current varying device, mechanical means operated by the electric generator to control said device proportionally to the speed of the generator, and an electromagnet subject to the current and pressure of the generator and regulating the operation of the current bearing device.

6. In an electric circuit including a generator and devices to be supplied with current therefrom, in combination with the field coil of the generator, two parallel electric circuits connected across the terminals of the generator in parallel with each other and in series with the field coil, one of said circuits containing a current varying device, means mechanically operated by the electric generator to control said device proportionally to the speed of the generator, a magnet structure having two magnet windings interdependently affecting said current varying device, one of said magnet windings being of high resistance and connected in parallel with the load upon the generator, the other of said magnet windings being of a low resistance and connected in series between the generator and its load.

7. A system of electric current distribution including a variable speed electric current generator; a consumption circuit supplied thereby; a current regulating circuit for regulating the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means for modifying the position of the follow up contact and which electro-magnetic means includes a current winding subject to the current of the system.

8. A system of electric current distribution including a variable speed electric current generator and a winding thereof; a consumption circuit supplied thereby; a current regulating circuit serving by its changes to vary the ampere turns of the generator winding to regulate the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means for modifying the position of the follow up contact and which electro-magnetic means includes a current winding subject to the current of the system.

9. A system of electric current distribution including a variable speed electric current generator; a consumption circuit supplied thereby; a current regulating circuit for regulating the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means for modifying the position of the follow up contact and which electro-magnetic means includes a pressure winding subject to the pressure of the system.

10. A system of electric current distribution including a variable speed electric current generator and a winding thereof; a consumption circuit supplied thereby; a current regulating circuit serving by its changes to vary the ampere turns of the generator winding to regulate the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means for modifying the position of the follow up contact and which electro-magnetic means includes a pressure winding subject to the pressure of the system.

11. A system of electric current distribution including a variable speed electric current generator; a consumption circuit supplied thereby; a current regulating circuit for regulating the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means for modifying the position of the follow up contact and which electro-magnetic means includes current and pressure windings respectively subject to the current and pressure of the system.

12. A system of electric current distribution including a variable speed electric current generator and a winding thereof; a consumption circuit supplied thereby; a current regulating circuit serving by its changes to vary the ampere turns of the generator winding to regulate the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means for modifying the position of the follow up contact and which electro-magnetic means includes current and pressure windings respectively subject to the current and pressure of the system.

13. A system of electric current distribution including a variable speed electric current generator; a consumption circuit supplied thereby; a current regulating circuit for regulating the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means modifying the position of the follow up contact and which electro-magnetic means includes opposing current and pressure windings respectively subject to the current and pressure of the system.

14. A system of electric current distribution including a variable speed electric current generator and a winding thereof; a consumption circuit supplied thereby; a current regulating circuit serving by its changes to vary the ampere turns of the generator winding to regulate the output of the generator; a regulator controlling the latter circuit, this regulator including a vibratory contact, means for vibrating said contact proportionately to the speed of the generator, and a sluggishly moving follow up contact complemental to the aforesaid contact; and electro-magnetic means for modifying the position of the follow up contact and which electro-magnetic means includes opposing current and pressure windings respectively subject to the current and pressure of the system.

15. A system of electric current distribution including a variable speed electric current generator and a winding thereof; a consumption circuit supplied thereby; a current regulating circuit serving by its changes to vary the ampere turns of the generator winding to regulate the output of the generator; a regulator controlling the latter circuit, this regulator including a vibratory contact, means for vibrating said contact proportionately to the speed of the generator; a contact complemental to the aforesaid contact; and electro-magnetic means for positioning the complemental contact with respect to its companion contact, said electro-magnetic means including oppositely acting current and pressure windings subject respectively to the current and pressure of the system.

16. A system of electric current distribution including a variable speed electric current generator; a consumption circuit supplied thereby; a current regulating circuit for regulating the output of the generator; a regulator controlling the latter circuit, this regulator including a vibratory contact, means for vibrating said contact proportionately to the speed of the generator; a contact complemental to the aforesaid contact; and electro-magnetic means for positioning the complemental contact with respect to its companion contact, said electro-magnetic means including oppositely acting current and pressure windings subject respectively to the current and pressure of the system.

17. A system of electric current distribution including a variable speed electric current generator and a winding thereof; a consumption circuit supplied thereby; a current regulating circuit serving by its changes to vary the ampere turns of the generator winding to regulate the output of the generator; a regulator controlling the latter circuit, this regulator including a vibratory contact, means for vibrating said contact proportionately to the speed of the generator; a contact complemental to the aforesaid contact; and electro-magnetic means for positioning the complemental contact with respect to its companion contact, said electro-magnetic means including current and pressure windings subject respectively to the current and pressure of the system.

18. A system of electric current distribution including a variable speed electric current generator; a consumption circuit supplied thereby; a current regulating circuit for regulating the output of the generator; a regulator controlling the latter circuit, this regulator including a vibratory contact, means for vibrating said contact proportionately to the speed of the generator; a contact complemental to the aforesaid contact; and electro-magnetic means for positioning the complemental contact with respect to its companion contact, said electro-magnetic means including current and pressure windings subject respectively to the current and pressure of the system.

In witness whereof we have hereunto subscribed our names in the presence of two witnesses.

HUGH HILL.
JOHN B. DYER.

Witnesses:
CLAYTON E. CHEESMAN,
RUTH HILL.

Copies of this patent may be obtained for five cents each, by addressing the "Commissioner of Patents, Washington, D. C."